Dec. 11, 1956

A. L. SAMUEL

TRANSMITTING AND RECEIVING CIRCUITS FOR WAVE TRANSMISSION SYSTEMS 2,774,066

Filed Jan. 30, 1943

3 Sheets-Sheet 1

INVENTOR
A. L. SAMUEL
BY
Earl C. Laughlin
ATTORNEY

Dec. 11, 1956 A. L. SAMUEL 2,774,066

TRANSMITTING AND RECEIVING CIRCUITS
FOR WAVE TRANSMISSION SYSTEMS

Filed Jan. 30, 1943 3 Sheets-Sheet 2

INVENTOR
A. L. SAMUEL
BY
Earl C. Laughlin
ATTORNEY

Dec. 11, 1956 A. L. SAMUEL 2,774,066

TRANSMITTING AND RECEIVING CIRCUITS FOR WAVE TRANSMISSION SYSTEMS

Filed Jan. 30, 1943 3 Sheets-Sheet 3

INVENTOR
A. L. SAMUEL
BY Earl C. Laughlin
ATTORNEY

United States Patent Office 2,774,066

Patented Dec. 11, 1956

2,774,066

TRANSMITTING AND RECEIVING CIRCUITS FOR WAVE TRANSMISSION SYSTEMS

Arthur L. Samuel, Summit, N. J., assignor to Bell Telephone Laboratories, Incorporated, New York, N. Y., a corporation of New York Application January 30, 1943, Serial No. 474,122

16 Claims. (Cl. 343—13)

The invention relates to transmitting and receiving circuits for wave transmission systems, and particularly to such circuits having a common portion, such as an antenna, for transmitting waves to and receiving waves from a wave transmission medium.

The circuits of the invention are particularly applicable for use in object location and distance measuring systems including means for transmitting recurring pulses usually of very high frequencies to a wave transmission medium, and for receiving from that medium return pulses (echoes) reflected from a distant object to be located, in combination with suitable apparatus for indicating on a time scale the time interval elapsing between the emission of each transmitted pulse and the arrival of the corresponding reflected pulse at the observation point, as a measure of the distance to the object, but are applicable as well to two-way radio or wire signal transmission systems of the duplex type.

Objects of the invention are to insure that the receiver in such a system is protected from the required high voltages of the transmitted wave pulses, that the received pulses are applied to the receiver with a minimum of loss, and that there is a minimum of attenuation between the local wave generating source and the antenna or other common transmission device during a wave transmitting period.

Another object is to reduce reflections at the common point of connection of the transmitter and receiver to the circuit leading to the antenna or other common transmission device in such a system.

These objects are attained simply and efficiently in accordance with the invention in general by the use of particular properly located branching connections of the lines associating the wave transmitter or pulse generator and receiver with the antenna or other common transmission device, and the use of a resonant cavity with an associated gas discharge device, suitably located with respect to the branching point, operating as a switch to effectively disconnect the reeciver from the antenna or other common transmission device during a pulse transmitting period, and to reconnect it at the end of the transmitted pulse and maintain it so connected during a pulse receiving period.

In one embodiment of the invention, a coaxial line connects the transmitter or wave generator to the antenna and the receiver is connected to the antenna through a portion of that line and another branching coaxial line including a resonant cavity with an associated gas discharge tube connected across it, by a series branching connection obtained by electrically coupling the input of the resonant cavity directly to the first coaxial line through a window or iris in the side wall of the latter. The portion of each transmitted pulse applied to the input of the resonant cavity builds up a resonant voltage across the gas tube sufficient to cause its discharge and thus produces an effective short-circuit across the cavity reducing the wave energy input to the receiver to a low value. The gas tube returns to the undischarged condition at the end of the transmitted pulse and is so maintained during the receipt of the incoming relatively low voltage pulse from the antenna.

In a modification of the invention, a second resonant cavity-gas discharge tube switch is similarly connected to the first coaxial line at a suitable point between the transmitter and branching point and operates to effectively disconnect the transmitter from the antenna during each pulse receiving period.

These and other features and objects of the invention are described in the following detailed description and are illustrated in the accompanying drawings in which.

Figure 1:
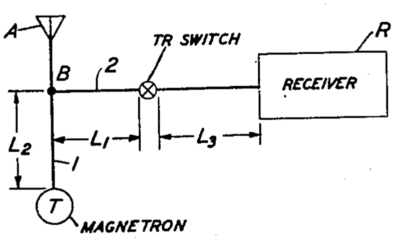
Fig. 1 shows a simplified application schematic of a signal transmitting and receiving system embodying the invention used in connection with a general description of the operation.

A general description of the method of operation of the entire system of the invention will be described in connection with the functional schematic of Fig. 1. During transmitting periods, wave energy flows from the transmitter T along the coaxial line (or wave guide) 1 toward the antenna A. Some of this energy enters at the point B the branch line 2 leading to the receiver R but encounters the (transmit-receive) switch TR which consists of a hollow chamber or cavity constructed and dimensioned so as to be resonant at the frequency of the outgoing wave generated by the transmitter T and the incoming wave received from the antenna A, with a pair of spark-gap electrodes connected across it at a suitable point so that the maximum resonant voltage is built up across the gap. The spark-gap is enclosed in an atmosphere of gas at low pressure so that it is easily broken down by the high voltage due to the transmitter pulse. Since the voltage across the gap is then limited by the discharge voltage and the voltage applied to the receiver R is still further reduced by the step down ratio of the resonant cavity, the reciver input is held to a small value.

The power dissipated in the spark-gap, and therefore abstracted from the transmitted pulse, is kept sufficiently small by the combined action of the discharge, the resonant cavity and the length $L_1$ of coaxial line (or wave guide) between the cavity input and the branching point B. The effect of the discharge is to place a low impedance (believed to the predominantly resistive) across the maximum impedance points of the cavity. This results in the appearance of a still lower apparent impedance across the input to the cavity. If the length $L_1$ between the branching point B and the input to the resonant cavity of the TR switch is an odd number of quarter wave-lengths, the apparent impedance looking toward the receiver R from the branching point B therefore becomes very large. Thus, if a "parallel" type electrical branching connection between the transmitter line and the receiver line is employed, as is usually the case for coaxial line branching systems, very little energy will be abstracted from the line 1 to the antenna A by the receiver branch 2. In the systems of the invention to be described a "series" electrical branching connection is used. In such cases, the receiver branch impedance at the branching point B during the discharge of the gas tube in the resonant cavity TR switch must be made small. To do this $L_1$ must be reduced to zero or to an even number of quarter wavelengths. The fact that $L_1$ can be made zero, thus eliminating one tuning adjustment, is of considerable practical value.

The length $L_3$ between the output of the resonant cavity of the TR switch (Fig. 1) and the receiver should also be made adjustable if the maximum protection of the receiver R from the high voltage of the transmitted pulse is to be maintained. At low levels the receiver input should terminate the portion $L_3$ of the line 2, but at high levels the input impedance of the receiver will depart markedly from the low level value. The length $L_3$ should be such that this mismatch reflects the highest possible impedance at the output of the resonant cavity of the TR switch.

At the end of the transmitted pulse the internal impedance of the transmitter T, which is of the magnetron type as described in connection with the system of Fig. 2, rapidly changes thus producing a decided mismatch with the characteristic impedance of the coaxial line (or wave guide). Signal pulses arriving at the antenna A then see the transmitting tube as an equivalent shorting plunger the position of which with respect to the branching point B may be adjusted by changing the length $L_2$. Thus, a particular length $L_2$ may be found for which essentially all the energy of each incoming pulse is made to enter the receiving branch. The gas discharge tube in the switch TR is made such that the discharge gap will not be broken down by the relatively small received voltages, although some loss will occur in the TR switch resonant cavity due to its inherent resistive and dielectric losses but by suitable design such losses may be kept small so as not to impair the performance of the system.

Figure 2:
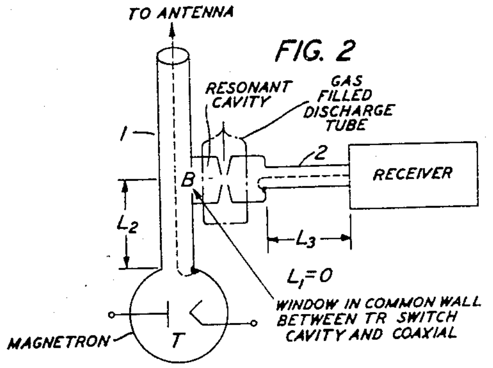
Fig. 2 shows schematically a signal transmitting and receiving system embodying one form of the invention employing coaxial lines for the branching transmitter and receiver lines.

In the modification of the invention shown in Fig. 2, the transmitter T, which may be a pulse generator of the magnetron type generating recurring pulses of ultra-high frequency, such as disclosed, for example, in United States Patent 2,063,342, issued December 8, 1936 to applicant, is connected directly to the common transmitting and receiving antenna A by a section of coaxial line 1 having the usual inner and outer concentric conductors. The receiver R is connected through a second section of coaxial line 2 to the output of the resonant cavity-gas discharge switch TR illustrated in more detail in Fig. 3, and the input of the resonant cavity is coupled directly ($L_1=0$) to the coaxial line 1 connecting the transmitter T to the antenna A, through an iris or window at the point B in the common wall of the outer conductor of that line and of the resonant cavity to provide the "series" branching type of connection. The length $L_3$ of coaxial line 2 between the receiver R and the output of the resonant cavity of the switch TR, and the length $L_2$ of the coaxial line 1 between the transmitter T and the branching point B are selected to respectively provide the proper impedance matching for maximum protection of the receiver R from the high voltages of the transmitted wave pulses, and to make substantially all the energy of incoming wave impulses received from the antenna A to pass into the receiver branch, as pointed out in connection with Fig. 1.

Figure 3:
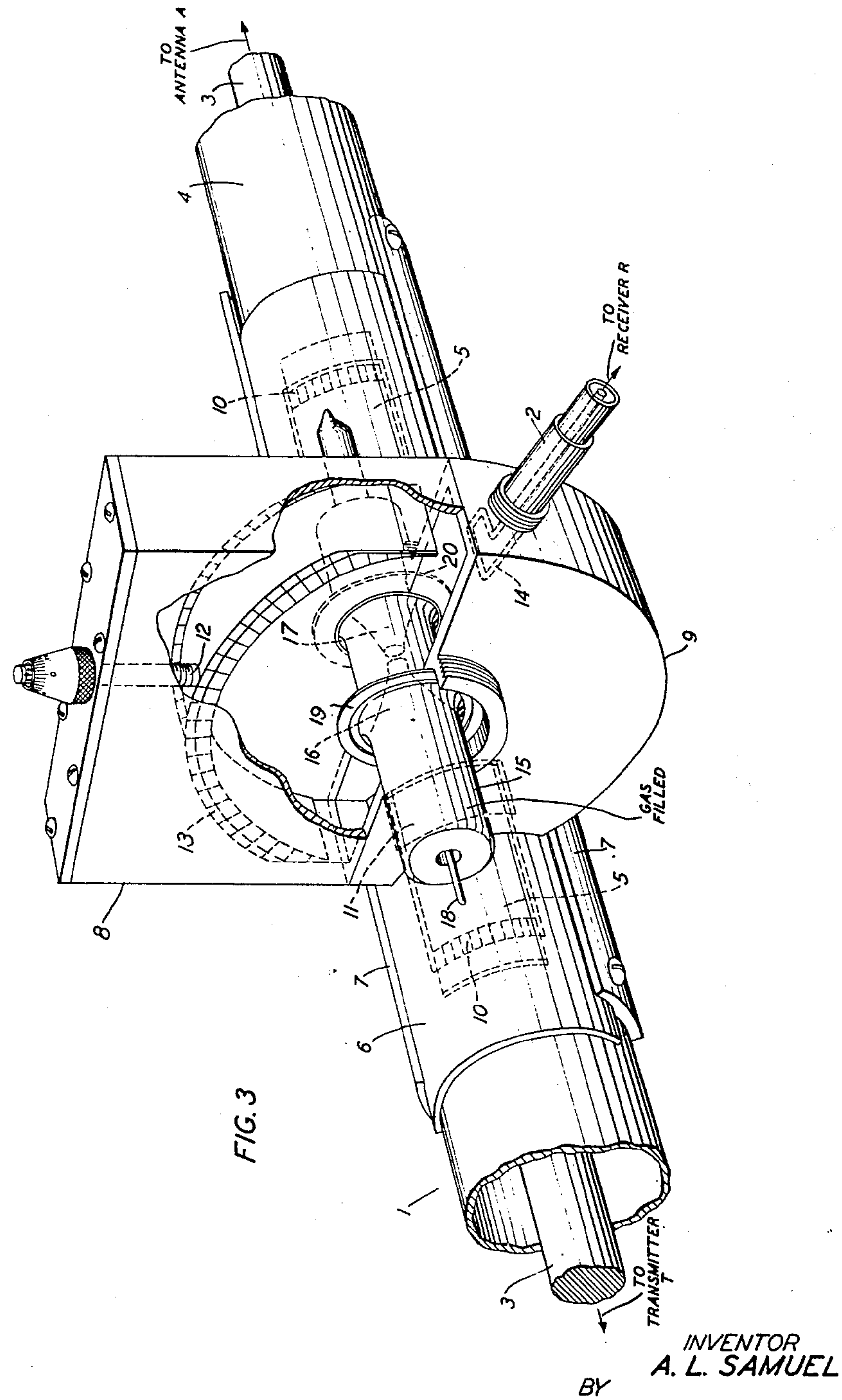
Fig. 3 shows a perspective view of a portion of the system of Fig. 2.

The details of one embodiment of the resonant cavity-gas discharge tube switch TR used in the system of Fig. 2 and of the arrangments for coupling it to the receiver coaxial line 2 and to the transmitter coaxial line 1 are shown in the perspective drawing of Fig. 3.

In Fig. 3, a coaxial line 1 having an inner conductor 3, and an outer conductor 4 with a longitudinal slot 5 in its side wall, connects the transmitter T to the antenna A as indicated. A sector of pipe 6 is adapted to slide along the portion of the outer coaxial conductor 4 containing the slot 5, and may be clamped in position at a desired point between the transmitter and antenna by the clamping plates 7 and associated clamping screws. A chamber comprising the upper rectangular box portion 8 and the lower cylindrical cavity resonator box portion 9, is mounted on the face of the pipe sector 6 and is held in fixed relation therewith by the contact fingers 10 on extensions of the chamber on the lower side of the pipe sector 6, so that its position along the slot 5 in the side wall of the outer coaxial conductor 4 is adjusted by the adjustment of the pipe sector 6 along that conductor. As indicated in dotted lines, the cavity resonator 9 has a small slot 11 in one side opposite to and opening into the slot 5 in the outer coaxial conductor 4 through a corresponding slot in pipe sector 6, so as to provide a window or iris electrically coupling one side of the resonant cavity 9 to the coaxial line 1 extending between the transmitter and the antenna. It will be seen that the position of the iris coupling between the resonant cavity 9 and the coaxial line 1 may be adjusted to provide the proper distance $L_2$ between it and the transmitter T so that substantially all of the energy of the incoming wave pulses received from the antenna A will be diverted into the cavity resonator 9. The tuning screw 12 extending through the upper rectangular box portion 8 of the chamber so as to bear against the flexible upper portion 13 of the cavity resonator 9 operating as a piston sliding along the side of the rectangular box portion 8, may be turned to effectively adjust the dimensions of the cavity resonator 9 to change its tuning by a small amount.

The threaded end of the branch coaxial line 2 leading to the receiver R screws into the cavity resonator 9 at a point directly opposite the iris 11 therein so that the coupling loop 14 attached to the inner and outer concentric conductors of coaxial line 2, extending within the cavity provides means for picking off wave energy therein of the resonant frequency received from coaxial line 1, for transmission to the receiver.

Connected across the cavity of cavity resonator 9 at the maximum impedance points is a gas discharge tube consisting of an outer glass vessel 15 enclosing an atmosphere of gas at low pressure, a pair of main electrodes 16 and 17 having axially aligned frusto-conical portions mounted with their smaller ends in juxtaposition and defining a spark-gap and an auxiliary electrode 18, termed an igniter or keep-alive electrode, in the form of a rod extending partly within the frusto-conical portion of one of the main electrodes. During operation of the tube, this auxiliary electrode 18 is maintained at a fixed negative potential with respect to the main electrodes 16 and 17 whereby a glow discharge is maintained between the auxiliary electrode and the adjacent frusto-conical portion, this discharge being substantially confined to the region outside of the high frequency field region between the main electrodes, the function of this glow discharge being to reduce the leakage power at the initiation of the firing of the tube. The main electrodes 16 and 17 of this gas tube are connected by the metallic collars 19 and 20 with opposite walls of the cavity resonator 9 effectively in shunt with the iris coupling 11. The maximum resonant voltage built up across the cavity by the energy of each transmitted wave pulse passing from the transmitter to the antenna will cause the gas in this gas discharge tube to break down and a discharge to be produced across the spark-gap to provide an effective short-circuit for that energy so that the portion of it transmitted by way of the coaxial line 2 to the receiver will be too small to cause any damage. As described in connection with Fig. 2, when the length of coaxial line between the transmitter and the iris 11 at the branching point is made of the proper value, all of the wave energy received from the antenna will pass through the resonant cavity 9 and coaxial line 2 to the receiver R, the relatively low voltage of this incoming low voltage energy being insufficient to cause the gas tube to discharge to short-circuit the receiver line.

Figure 4:
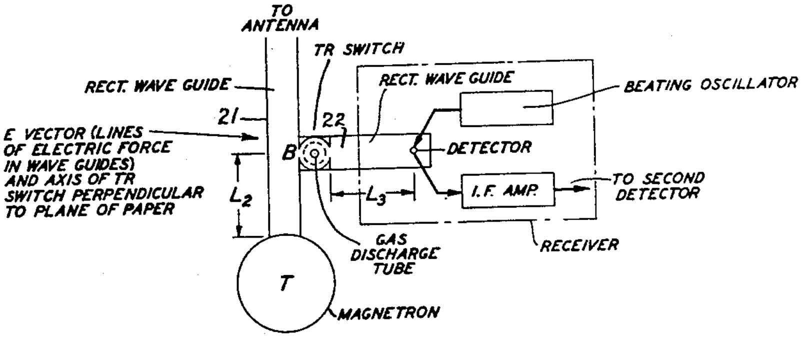
Fig. 4 shows schematically a modified system in accordance with the invention employing wave guides for the branching transmitter and receiver lines.

A transmitting-receiving system of the series branching type substantially like that of Fig. 2 except for the use of rectangular wave guides in place of coaxial lines is illustrated in Fig. 4. For the case of wave guides, further elaboration of the concepts of "series" and "parallel" branching appears to be desirable at this point. As pointed out by W. A. Tyrrell in his copending patent application, Serial No. 470,810, filed December 31, 1942, Patent No. 2,445,895, a 90-degree wave guide branch lying in the magnetic plane (in the plane parallel to the lines of mganetic intensity in both joined wave guides) exhibits the properties of a parallel branch at least as regards phase relations, provided that any discontinuity in the branch guide is kept well away from the junction. Similarly, a 90-degree wave guide branch in the electric plane (in the plane parallel to the lines of electric intensity in the joined wave guides) corresponds to a series branch. However, in either case, a piston brought up in the branch guide to close the opening into the main guide will obviously completely "short out" the branch. In this restricted sense, either type of branch may be considered a "series" branch. Thus, a transmit-receive switch of the resonant cavity gas discharge tube type mounted on any face of the main guide and coupled into the guide by a suitable window in the common wall will act as if it were connected in series with the impedances looking in either direction along the main guide.

In the wave guide arrangement shown in Fig. 4, a rectangular wave guide 21 is employed for connecting the transmitter T to the antenna A, and another wave guide 22 for connecting the receiver R (illustrated diagrammatically as being of the double detection or superheterodyne type) to the first wave guide 21 at right angles thereto, longitudinal sectional views of the two wave guides being given with the short side of the rectangular cross-section in the plane of the paper. The resonant cavity portion of the switch TR which is tuned to the dominant wave, that is, the wave of lowest critical frequency generated by the transmitter or received from the antenna, is formed as indicated by inserting irises at suitably spaced points in the branch guide 22, the gas discharge tube being connected across the resonant cavity at the maximum impedance points as indicated diagrammatically. In the case illustrated in Fig. 4, one of the two end irises in the resonant cavity is inserted in the common wall between the resonant cavity and the main wave guide to provide electrical coupling between the two guides which is of the "series" branching type. However, the series branching connection may be obtained also by locating the iris at the input of the resonant cavity an even number of quarter wave-lengths from the junction of the two guides.

As in the case of the system of Fig. 2, the resonant voltage built up across the input of the resonant cavity in the system of Fig. 4 by each transmitted pulse, causes the discharge of the gas tube to effectively short-circuit the input to the receiver R, whereas, if the gas tube is properly designed, the resonant voltage built up across the resonant cavity by the incoming pulse received from the antenna A will be insufficient to cause the gas tube to discharge and the received waves will be transmitted to the receiver with little loss. Also, as in the case of the coaxial line arrangement of Fig. 2, the length of line $L_2$ between the transmitter T and the branching point B will be selected with respect to the impedance of the transmitter T in the non-pulsing condition so that essentially all of the energy received from the antenna A is made to enter the wave guide receiving branch 22, and the length of line $L_3$ between the TR switch resonant cavity output and the receiver R is made such that the mismatch reflects the highest possible impedance at the output of the TR switch.

A mathematical analysis of the gas switching tube circuits of Figs. 2 to 4 is given below, this analysis being limited to cavities at or near the dominant resonant mode in which the coupling mechanism is of the normal type, i. e., in which the cavities behave like shunt resonant circuits when viewed at the input terminals.

*The δ parameters*

The generalized resonant cavity is thought of as a shunt resonant circuit to which are coupled resistive input and output circuits. When the cavity is excited by energy supplied from the input circuit, there exists in the cavity a certain amount of reactive power which will be designated by the symbol $P_0$. Of this power, a certain fraction $\delta_0$ is dissipated as losses in the cavity itself where $$\delta_0=\frac{1}{Q_0} \qquad (1)$$

The symbol $Q_0$ with the subscript is further defined as the intrinsic Q (ratio of inductance to resistance), that is, the Q without external loading, to differentiate it from the more general $Q_L$ which is the measured Q when the cavity is loaded down by external coupling. It should be noted that this definition of $\delta$ differs from the logarithmic decrement by a factor $\pi$.

When coupled to the external circuits, the loaded $\delta$ is increased. On the assumption that the loading effects of the input and output irises are independent we can write $$\delta_L=\delta_0+\delta_1+\delta_2 \qquad (2)$$

where $\delta_L$ is the loaded $\delta$, and $\delta_1$ and $\delta_2$ are respectively the input and output loadings. Physically the assumption underlying this expression is that the distribution of electromagnetic fields within the cavity is not seriously altered by the input and output coupling devices. This assumption should certainly be valid as long as the absolute values of the $\delta$'s are very small compared to unity. Since the $\delta$'s usually encountered are of the order of $10^{-3}$ or less, the assumption seems to be justified.

Equation 2 may be written $$\frac{1}{Q_L}=\frac{1}{Q_0}+\delta_1+\delta_2 \qquad (3)$$

The values of $\delta_1$ and $\delta_2$ evidently depend upon the ratio of the apparent series resistance which the external coupling introduces into the resonant cavity, to the effective reactance of the cavity, that is, $$\delta_1=\frac{k_2{}^2R_1}{X} \qquad (4)$$

where $k_1$ is the transformation ratio of the input coupling device, $R_1$ is the resistance of the input circuit and X is the cavity reactance. Similarly $$\delta_2=\frac{k_2{}^2R_2}{X} \qquad (5)$$

The values of the $\delta$'s may be equally well considered as the ratios of the coupled conductance to the shunt susceptance of the cavity considered as a shunt resonant circuit so that Equations 4 and 5 become $$\delta_1=\frac{G_1}{k_0{}^2B} \qquad (6)$$

and $$\delta_2=\frac{G_2}{k_0{}^2B} \qquad (7)$$

when the R's and X's are replaced by their reciprocals and transformed from a shunt to a series circuit.

Figure 5:
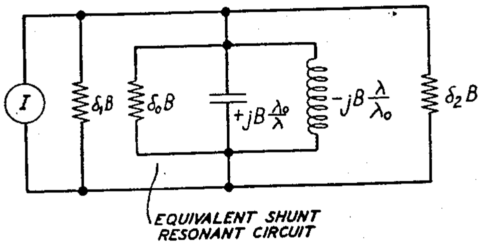
Figs. 5 and 6 show simple circuit equivalents of portions of the systems of Figs. 2 to 4 used in connection with a mathematical analysis of their operation.

The equivalent shunt resonant circuit for the cavity is shown in Fig. 5 where for convenience everything is referred to the cavity and the source is represented by a constant current generator.

*The low-level transmission*

We are now in a position to express the low level transmission of the cavity. The available power is given by $$P\ (\text{avail})=\frac{I^2}{4\delta_1 B} \qquad (8)$$

while the power actually going into the load is given by $$P\ (\text{out})=\frac{I^2\delta_2 B}{(\delta_0+\delta_1+\delta_2)^2B^2} \qquad (9)$$

and the transmission ratio defined as T is given by $$T=\frac{4\delta_1\delta_2}{(\delta_0+\delta_1+\delta_2)^2} \qquad (10)$$

One additional expression is desired. This is the ratio of cavity input resistance to the resistance of the input circuit. This is evidently the reciprocal of the conductance ratio and is given by $$\sigma=\frac{\delta_1}{\delta_0+\delta_2} \qquad (11)$$

The low level behavior of the cavity is thus defined by three equations.

$$\delta_L=\delta_0+\delta_1+\delta_2 \qquad (2)$$

$$T=\frac{4\delta_1\delta_2}{(\delta_0+\delta_1+\delta_2)^2} \qquad (10)$$

$$\sigma=\frac{\delta_1}{\delta_0+\delta_2} \qquad (11)$$

*High level operation*

The high level performance of the cavity containing a gas discharge can be expressed directly in terms of our original definitions. The energy reaching the ouput circuit is by definition equal to $P_0\delta_2$. When the gas discharge becomes conducting, the value of $P_0$ is set by the character of the discharge and the leakage power is given by $$P_r=P_0\delta_2 \qquad (12)$$

Figure 6:
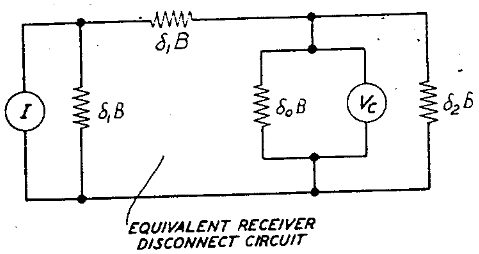

When the tube is functioning as a receiver disconnect switch, the equivalent circuit becomes as shown in Fig. 6. The power dissipated in the cavity walls, the gas discharge and in the output circuit must evidently be given by $$P_1=\frac{I}{2}V_c=(PP_0\delta_1)^{1/2} \qquad (13)$$

if $V_c<<I/\delta_1 B$.

Of this power an amount called the excitation power $$P_e=P_0\delta_0 \qquad (14)$$

is lost in the cavity walls. The net loss of power in the gas discharge is given by $$P_g=P_1-P_r-P_e \qquad (15)$$

or $$P_g=(PP_0\delta_1)^{1/2}-P_0(\delta_0+\delta_2) \qquad (16)$$

Since the last term is usually very small compared to the first term, we may write $$P_g=PP_0\delta_1)^{1/2} \qquad (17)$$

*The derived g parameters*

For some purposes it is convenient to eliminate $\delta_0$ from the expressions for T and $\sigma$. This may be done by defining $$g_1=\frac{\delta_1}{\delta_0} \qquad (18)$$

and $$g_2=\frac{\delta_2}{\delta_0} \qquad (19)$$

Introducing these new parameters the equations become $$\frac{Q_0}{Q_L}=1+g_1+g_2 \qquad (20)$$

$$T=\frac{4g_1g_2}{(1+g_1+g_2)^2} \qquad (21)$$

$$\sigma=\frac{g_1}{1+g_2} \qquad (22)$$

$$P_r=P_e g_2 \qquad (23)$$

$$P_g=(PP_e g_1)^2 \qquad (24)$$

The $g$ parameters are particularly useful in defining the behavior of a tube and cavity combination when $\delta_0$ is a fixed quantity while the effects of changes of $\delta_0$ are more clearly shown when the $\delta$ parameters are used. The $g$ parameters may be determined experimentally, using Equations 21 and 22 without knowing the value of $\delta_0$, that is of $Q_0$. On the other hand the $g$'s are altered if a tube is replaced by one giving a different $Q_0$ value while the $\delta$'s are intrinsic properties of the coupling mechanisms and remain fixed as long as the cavity and the tube tune at the same frequency and have the same effective reactance.

*Off-resonance transmission*

The analysis can be extended to predict the transmission when the cavity is detuned from resonance by introducing the necessary susceptance term in Equation 9 above and solving for T. This gives for the absolute value (neglecting phase)

$$T=\frac{4\delta_1\delta_2}{[\delta_0+\delta_1+\delta_2]^2+\left[\frac{\lambda}{\lambda_0}-\frac{\lambda_0}{\lambda}\right]^2} \qquad (25)$$

where $\lambda_0$ and $\lambda$ are respectively the resonant wave length and the operating wave length.

This may be rewritten as $$T=\frac{T_0}{1+Q_L^2\left[\frac{\lambda}{\lambda_0}-\frac{\lambda_0}{\lambda}\right]^2}$$

where $T_0$ is the in-tune transmission and $Q_L$ is the loaded Q, if it is assumed that the $\lambda$'s and $Q_L$'s remain unchanged for small departures from the resonant wave length.

In some object location systems it may be advisable to insert a second TR switch in the series branching circuits of the type shown in Figs. 2 to 4 to disconnect the transmitter from the antenna during the receiving period. Such a situation may arise if the transmitter tube does not produce the desired impedance mismatch. Even if this is not the case, the use of the second gas tube switch may still be desirable because it eliminates the need for an adjustment of the line length between the transmitter and the TR switch. In systems using wave guides or large diameter coaxial lines, this adjustment can be very inconvenient. This is particularly true at the longer wave lengths.

Figure 7:
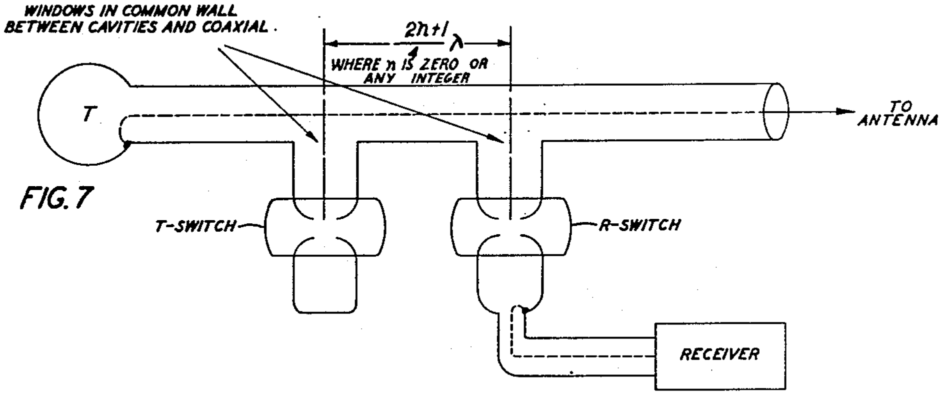
Figs. 7 and 8 show respectively modifications of the coaxial line and wave guide systems of Figs. 2 and 4 including an additional resonant cavity-gas tube switching device for effectively disconnecting the transmitter from the antenna during the receiving period.
Figure 8:
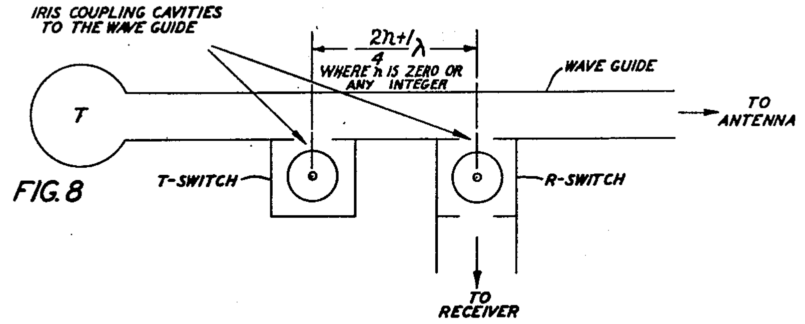

Figs. 7 and 8 respectively show the systems of Figs. 2 and 4 modified to add the second TR resonant cavity gas discharge tube switch at the proper point for the above purpose. For convenience the transmitter disconnect switch will be called the "T switch" as contrasted with the "R switch" which disconnects the receiver from the antenna.

Referring to Fig. 7, it will be seen that the arrangement illustrated, differs essentially from that of Fig. 2 merely in the addition of the "T switch" between the transmitter T and the "R switch" which are shown diagrammatically each being identical with the resonant cavity-gas tube switch referred to as the TR switch in the system of Fig. 2. During transmission energy flowing from the transmitter T along the coaxial transmission line 1 towards the receiver R and the antenna A first encounters the "T switch" which is caused to be fired by the applied high resonant voltage. If this switch is properly adjusted, the resulting impedance mismatch will limit the power dissipated in its resonant cavity to a small value which is calculated below. The transmitted energy then encounters the "R switch" which also fires as previously described in connection with Fig. 2 so that most of the energy reaches the antenna A and is radiated. During transmission, the desired adjustments of the circuit of the "T switch" would be similar to those required for the circuit of the "R switch."

During reception energy arriving from the antenna A over the coaxial line 1 will first encounter the "R switch," but, unless certain conditions are satisfied, some of this energy will proceed down transmission line 1 and will be dissipated in the "T switch" and in the transmitter T. It is the function of the "T switch" to effectively short-circuit the transmission line just beyond the "R switch." Since the circuit of the "T switch" is in series with the transmitter T the impedance of which cannot be assumed to be any fixed value, the only way in which this can be accomplished is to make the input impedance of the circuit of the "T switch" large and real and to introduce a line section having a length equal to a quarter wave-length or an odd multiple of a quarter wave-length $$\left(\frac{2n+1}{4}\lambda\right.$$

where $n$ is zero or any integer) between it and the circuit of the "R switch." The ratio of the input impedance to the line impedance will be called $\sigma$. It should be noted that $\sigma$ is also the standing wave ratio (voltage or current) on the line between "T" and "R," this relationship being true only for the special case in which $\sigma$ is real. The larger the value of $\sigma$ the larger will be the fraction of the total received energy which enters the receiver branch. The performance of the circuit of the "T switch" can therefore be specified in terms of the power loss in the gas discharge, which should be small and the unfired $\sigma$ which should be large. The first requirement is identical with a similar requirement for the "R switch," while the second requirement contrasts with the circuit of the "R switch" requirement where the condition $\sigma=1$ is desired.

*The idealized gas discharge "T switch" circuit*

Figure 9:
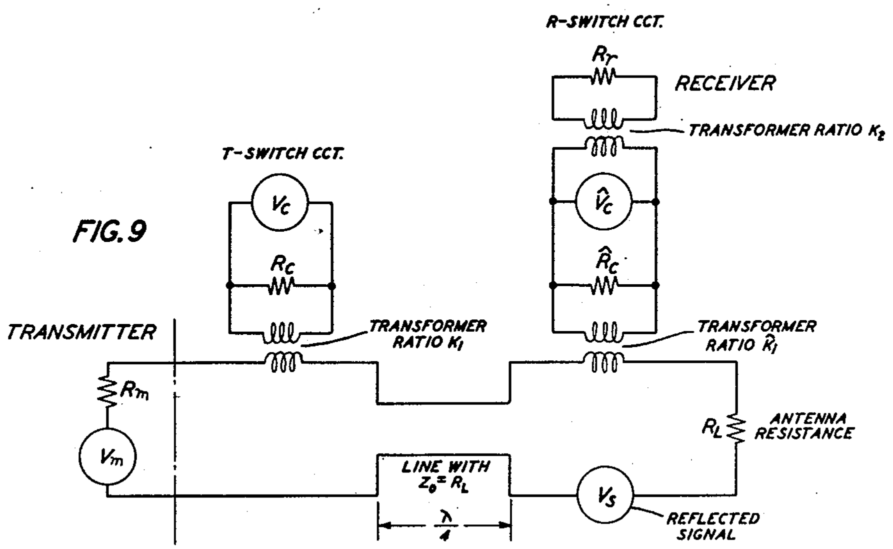
Fig. 9 shows schematically a simplified circuit equivalent of the system of Fig. 7 or 8 used to explain the method of operation.

It will be instructive to consider an idealized "T switch" circuit in which the gas discharge acts to maintain a constant low voltage during the transmitting period, and in which the low level losses are small and are all caused by ohmic resistance effects. The delayed recovery action of the gas will be disregarded. The circuit for such a device is shown in Fig. 9. This circuit is of the series branching type with the transmitter T, the "T switch" circuit, the "R switch" circuit and the antenna A all in series. The "T switch" and "R switch" circuits are separated by a quarter wave-length line. For purposes of computation equivalent circuits of the circuit parts shown in Figs. 7 and 8 were used. The transformer ratios $K_1$ and $K_1$ super-caret represent the voltage transformations provided by the input irises coupling the gas discharge T-switch and R-switch circuits, respectively, to the main wave guide, and the transformer ratio $K_2$ the voltage transformation provided by the output iris coupling the gas discharge R-switch circuit to the receiver load $R_r$.

During the receiving condition the source $V_S$ is assumed constant. The value $K_1$ is adjusted until the desired mismatch is obtained where this mismatch is specified by $\sigma$. Neglecting the effect of the transmitting tube, the value of $\delta$ is given by $$\sigma=\frac{Q_O}{Q_L}-1 \qquad (27)$$

where $Q_O$ is the unloaded Q of the "T switch" circuit and $Q_L$ is the Q when coupled to the input. The factor F by which received signal is reduced is given by $$F=\frac{\sigma}{1+\sigma} \qquad (28)$$

If the transmitting tube impedance measured at the "T switch" junction is not zero but is nevertheless real, the actual value of $\sigma$ to use in Equation 28 will exceed that given by 27, by the addition of a term $\sigma m$ given by the ratio of the transmitting tube impedance measured at the "T" circuit junction to the load impedance. If the transmitting tube impedance is complex, the resultant value of $\sigma$ will be complex and Equation 28 no longer holds. However, if the "T" tube is properly adjusted, its $\sigma$ is real and the value of F given by 28 is a minimum value.

During the transmitting condition the voltage $V_c$ across the "T switch" circuit is fixed by the character of the discharge. The power dissipated in the gas tube is then given by $$Pg=\left[\frac{P_L V_c^2 F}{R_c(1-F)}\right]^{1/2} \qquad (29)$$

where $P_L$ is the power going into the load, $V_c$ is the voltage drop across the gas tube, $R_c$ is the unloaded resonant impedance of the gas tube circuit and F is the low level loss factor defined above. The magnitude $P_g$ will, in general, be small compared to $P_L$ and so will have an almost negligible effect on the transmitted signal. It is of great importance, however, in its effect on the gas tube life.

Equation 29 is similar to the expression for the power dissipated in the "R switch" in its dependence on the transmitter power and on the intrinsic characteristics of the gas tube and its associated circuit, but differs from this expression in the introduction of $$\left(\frac{F}{1-F}\right)^{1/2}$$

instead of $$\left(\frac{1}{1-T}\right)^{1/2}$$

*The practical application of the "T switch" circuit*

A reasonable system procedure might be one which depended upon the transmitter to assist the "T switch" circuit in reducing the low level loss. With a knowledge of the variations in the transmitting tube impedance, it is possible to fix the transmission line length between this tube and the "T switch" circuit at such a value that the average transmitting tube will increase the standing wave ratio. As an example, if an average transmitter tube gives a $\sigma m$ value of 10 decibels then with a "T switch" circuit adjusted to have a $\sigma$ value of 14 decibels, the low level loss with the typical transmitting tube will be 0.26 decibel but it may be as bad as 0.80 decibel with occasional tubes. The gas discharge power will be the same as that in the "R switch" circuit adjusted for 1 decibel low level loss, which is a likely figure. The total low level loss chargeable to duplexing will then vary between 1.26 decibels for a good transmitting tube to 1.8 decibels for one with exactly the wrong effective lead length.

The complete TR switch can be constructed as a single unit since the adjustment of the distance between the "T switch" and the "R switch" junctions is not critical. This unit would contain three sets of terminals (for the transmitter, the receiver, and the antenna respectively) and two tuning adjustments, one on each cavity. The need for trombone sections, sliding junctions, etc. is completely eliminated. These advantages must be balanced against the requirement of the second cavity and the second tube.

Various modifications of the circuits illustrated and described which are within the spirit and scope of the invention will occur to persons skilled in the art.

What is claimed is:

1. A terminal circuit for a two-way signal transmission medium in a two-way signal transmission system, comprising an alternating signal wave generator, a signal receiver, common transmission means for transmitting the waves produced by said generator to said medium and for receiving incoming alternating signal waves from said medium, a coaxial line connecting said generator to said common transmission means, a branch coaxial line connecting said receiver to the first coaxial line by a series branching connection, a chamber resonant to the frequency of the outgoing waves produced by said generator and of the incoming waves received from said medium, connected in said branch coaxial line, a gas discharge device connected across said resonant chamber, adapted to discharge in response to the resonant voltage applied to the chamber by the outgoing signal waves from said generator to effectively short-circuit said chamber and thus the input to said receiver during signal transmitting periods, and to remain in the undischarged condition in response to the relatively lower resonance voltage applied to the chamber by the incoming signal waves from said medium, to allow transmission of said incoming waves to said receiver with minimum attenuation during signal receiving periods.

2. The terminal circuit of claim 1 in which said first coaxial line comprises inner and outer concentric conductors, said series branching connection of said first coaxial line and said branch coaxial line being attained by locating said resonant chamber in the input of the latter and coupling it directly to the first coaxial line through an iris in the side wall of the outer conductor of that line.

3. The terminal circuit of claim 1 in which the receiver branch impedance at the branching point between said first and said branch coaxial lines is made small during the discharge of said gas tube by making the distance between said branching point and the input of said resonant circuit substantially zero.

4. The terminal circuit of claim 1 in which the receiver branch impedance at the branching point between said first coaxial line and said branch coaxial line is made small by making the distance between said branching point and the input of said resonant chamber therein an even number of quarter wave-lengths.

5. In combination in a duplex signal transmission system, an alternating signal wave generator, an alternating signal wave receiver, a common transmitting and receiving antenna, a coaxial line comprising inner and outer coaxial conductors, connecting said generator to said antenna, a chamber resonant to the frequency of the signal waves of the outgoing signal waves produced by said generator and of the incoming signal waves picked up by said antenna, a gas discharge device connected across said chamber, a line coupling one end of said resonant chamber to said receiver, an iris common to said outer conductor of said coaxial line and the other end of said resonant chamber providing a direct coupling therebetween, said gas discharge device being such as to be discharged to provide an effective short-circuit across said resonant chamber and thus across the input to said receiver in response to the voltage applied to the chamber by the outgoing signal waves from said generator during signal transmitting intervals and to be maintained in the undischarged condition in response to the relatively smaller voltage applied to said chamber by the incoming signal waves from said antenna, to provide minimum attenuation in the receiver branch line during signal receiving intervals.

6. The system of claim 5 in which the length of line between said receiver and said resonant cavity is made such that the impedance mismatch therebetween reflects the highest possible impedance at the output of said resonant cavity.

7. The system of claim 5 in which the length of line between said wave generator and said iris is proportioned with respect to the impedance of said generator in the non-transmitting condition so that substantially all of the energy of incoming signals received from said antenna is diverted at the line branching point into the receiver line.

8. In combination in an object locating system, a generator producing recurring pulses of ultra-high frequency, a common antenna for radiating said pulses and for receiving return pulses of that frequency reflected from an object to be located in the path of the radiated pulses, a receiver for said return pulses, a coaxial line having outer and inner coaxial conductors, connecting said generator with said antenna, the outer coaxial conductor having a slot in its sidewall, a resonant chamber resonant to said ultra-high frequency, having a gas discharge tube connected across it at high impedance points, a second transmission line coupling the output of said resonant chamber to said receiver, a series branching electrical coupling between said coaxial line and said resonant chamber comprising an iris connecting the input of the latter through said slot with the interior of said outer conductor, said gas discharge device being such as to discharge to effectively short-circuit said chamber and thus the input to said receiver in response to the resonant voltage applied to said chamber through said series branching coupling during each pulse transmitting period, and to be maintained in the undischarged condition in response to the relatively smaller resonant voltage applied to said chamber through said coupling during each pulse receiving period, the distance of said iris from said generator being proportioned with respect to the impedance of the latter during non-pulsing intervals so that substantially all of the energy of the received pulses is diverted into the receiver branch, and the distance between said receiver and the output of said resonant chamber is proportioned with respect to the impedance of said receiver so that the transmitted pulse input to the receiver is a minimum during each pulse transmitting period.

9. In combination in a duplex signal transmission system, a generator for producing signal pulses of a given frequency, a receiver for receiving signal pulses, a common antenna for radiating the pulses generated by said generator and for receiving incoming signal pulses of corresponding frequency, a transmission line comprising a tubular conductor, connecting the output of said generator to said antenna, one switching device comprising a cavity resonant at said frequency and a gas discharge tube connected across it, a second transmission line electrically coupling the output of said resonant cavity to said receiver, a series branching electrical coupling between first transmission line and said resonant cavity comprising a common wall between the input of the latter and said tubular conductor and an iris in said common wall, said gas tube being such as to discharge to short-circuit said cavity in response to the resonant voltage applied to said chamber through said coupling during each pulse transmitting period and to be maintained undischarged in response to the relatively smaller voltage applied to said chamber through said coupling during each pulse receiving period, so as to effectively disconnect said receiver from said antenna during each pulse transmitting period and to reconnect it at the end of a transmitting pulse and during pulse receiving periods, another switching device identical with said one switching device and coupled to said first transmission line in similar manner at a point between said generator and the point of connection of said one switching device to that line at a distance of a quarter wave-length from the latter point, said other switching device operating in response to the received signal pulses to effectively disconnect said generator from said antenna during each receiving period.

10. The combination of claim 9 in which said transmission line comprising a tubular conductor is a coaxial line having inner and outer concentric conductors, and the iris coupling the resonant cavity of each switching device to said coaxial line is located in the common wall between the outer conductor of the latter and the resonant cavity input.

11. In a high frequency transmission and receiving system including a transmitter system, an antenna system, and a conducting system therebetween, a pair of resonant circuits coupled to said conducting system, a spark gap in each of said resonant circuits, a receiver coupled to one of said resonant circuits, the couplings of said resonant circuits to said conducting system being linearly spaced a distance substantially equal to a small odd multiple of a quarter wave length of the waves on said system, said resonant circuit to which said receiver is coupled being coupled to said conducting system at a point more remote from said transmitter system than the coupling between said other resonant circuit and said conducting system.

12. A guided wave transmission and receiving system including in combination, a wave guide, a transmitter associated with said wave guide, a pair of duplexing cavities mounted on said wave guide, said duplexing cavities each including a spark gap and each having an iris opening into said wave guide, said irises having their centers spaced at a distance substantially equal to an odd multiple of a quarter wave length of the waves on said system, said multiple being less than five.

13. In a high frequency transmission and receiving system including a transmitter system, an antenna system, and a conducting system therebetween, a pair of resonant circuits inductively coupled to said conducting system, and resonant at the transmission frequency of said transmitter system, a spark gap in each of said resonant circuits, a receiver coupled to one of said resonant circuits, the couplings of said resonant circuits to said conducting system being linearly spaced a distance substantially equal to a small odd multiple of a quarter wavelength of the waves on said system, said resonant circuit to which said receiver is coupled being coupled to said conducting system at a point more remote from said transmitter system than the coupling between said other resonant circuit and said conducting system.

14. A guided wave transmission and receiving system including in combination, a wave guide, a transmitter associated with said wave guide, a pair of duplexing cavities mounted on said wave guide, said duplexing cavities each including a spark gap and each having an iris opening into said wave guide, said irises having their centers spaced at a distance substantially equal to an odd multiple of a quarter wave length of the waves on said system.

15. A guided wave transmission and receiving system including in combination, a wave guide, a transmitter associated with said wave guide, a pair of duplexing cavities mounted on said wave guide, said duplexing cavities each including a gaseous discharge tube having electrodes providing a spark gap, and each having an iris opening into said wave guide, said irises having their centers spaced at a distance substantially equal to an odd multiple of a quarter wavelength of the waves on said system, one of said cavities being spaced at a point from the transmitter end of said wave guide where the line current produced by the standing waves in the section therebetween when the system is receiving is at a minimum.

16. In a high frequency transmission and receiving system including a transmitter system therebetween, an antenna system, and a conducting system, a pair of resonant circuits coupled to said conducting system, a spark gap in each of said resonant circuits, a receiver coupled to one of said resonant circuits, the couplings of said resonant circuits to said conducting system being linearly spaced a distance substantially equal to a small odd multiple of a quarter wavelength of the waves on said system, said resonant circuit to which said receiver is coupled being coupled to said conducting system at a point more remote from said transmitter system than the coupling between said other resonant circuit and said conducting system, said coupling between said other resonant circuit and said conducting system being spaced at a point from the transmitter end of said conducting system where the line current produced by standing waves in the section therebetween when the system is receiving is at a minimum.

References Cited in the file of this patent

UNITED STATES PATENTS

| | | |
|---|---|---|
| 2,281,274 | Dallenbach et al. | Apr. 28, 1942 |
| 2,281,717 | Samuel | May 5, 1942 |